(12) United States Patent
McDade et al.

(10) Patent No.: US 8,441,941 B2
(45) Date of Patent: May 14, 2013

(54) AUTOMATING IDENTIFICATION AND ISOLATION OF LOOP-FREE PROTOCOL NETWORK PROBLEMS

(75) Inventors: Iain McDade, Hamilton (GB); John Monaghan, Dunbartonshire (GB); Samer Salam, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 530 days.

(21) Appl. No.: 12/245,895

(22) Filed: Oct. 6, 2008

(65) Prior Publication Data
US 2010/0085878 A1    Apr. 8, 2010

(51) Int. Cl.
H04L 12/26    (2006.01)
(52) U.S. Cl.
USPC ..................................... 370/242; 370/241.1
(58) Field of Classification Search ................. 370/242, 370/248–249, 254–258
See application file for complete search history.

(56) References Cited

U.S. PATENT DOCUMENTS

| | | | |
|---|---|---|---|
| 2006/0110158 A1* | 5/2006 | Carrick et al. | 398/32 |
| 2008/0089246 A1* | 4/2008 | Ghanwani et al. | 370/256 |
| 2008/0310422 A1* | 12/2008 | Booth et al. | 370/395.53 |
| 2009/0116404 A1* | 5/2009 | Mahop et al. | 370/254 |
| 2009/0232006 A1* | 9/2009 | Mohan et al. | 370/241.1 |
| 2010/0177641 A1* | 7/2010 | Farkas et al. | 370/242 |

* cited by examiner

*Primary Examiner* — Bunjob Jaroenchonwanit
(74) *Attorney, Agent, or Firm* — Hickman Palermo Truong Becker Bingham Wong LLP

(57) ABSTRACT

An apparatus is configured to generate a reference model of a bridged network representing a plurality of nodes in the bridged network, wherein each of the plurality of nodes implements a loop-free topology algorithm; determine an expected data path based on the reference model of the bridged network; receive information pertaining to an actual data path in the bridged network; and compare the expected data path based on the reference model and the actual data path in the bridged network to identify a divergence point.

38 Claims, 7 Drawing Sheets

Representation 50
(Based on a reference model of a bridging protocol domain)

AUTOMATING IDENTIFICATION AND ISOLATION OF LOOP-FREE PROTOCOL NETWORK PROBLEMS

TECHNICAL FIELD

The present disclosure generally relates to data communication networks. The disclosure relates more specifically to addressing loop-free topology protocol network problems.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The advent of Ethernet as a Metropolitan and Wide-Area Networking technology imposes a new set of Operations, Administration and Maintenance (OAM) requirements on Ethernet's traditionally Enterprise-centric modus operandi. The expansion of this technology into the domain of Service Providers, where networks are substantially larger and more complex (compared to Enterprise) and user-base is wider, makes the notion of operational management of link uptime crucial. More importantly, the absolute timeliness in isolating and responding to a failure becomes mandatory for normal day-to-day operations, and OAM translates directly to the competitiveness of the Service Provider.

In computer networks such as the Internet, frames are sent from a source to a destination via a network of elements including links (communication paths such as telephone or optical lines) and nodes (for example, bridges directing the frame along one or more of a plurality of links connected to it) according to one of various routing protocols. Network segments may include bridged networks where no assumptions are made about where in the network a particular device is located and frames are forwarded between devices through a process known as MAC Address learning.

Bridged networks may, however, include forwarding loops which may result in flooding of the network. In order to avoid loops, protocols, such as the Spanning Tree Protocol (STP), ensure a loop free active topology for a bridged network. STP allows a network design to include spare (redundant) links to provide automatic backup paths if an active link fails, without the danger of bridge loops, or the need for manual enabling/disabling of these backup links.

The STP creates a tree of connected OSI layer-2 bridges or nodes (e.g., Ethernet switches), and disables the links which are not part of that tree, leaving a single active path between any two network bridges. Further, the STP may rely on a routing algorithm resident at each node that computes the spanning tree based on lowest total cost of the costs associated with each link traversed on a data path. Specifically, the algorithm may determine the root node within a bridged network and compute the port roles (root, forwarding, or blocked) to forward data to the root node. Information regarding node IDs and root path costs may be exchanged using special data frames called Bridge Protocol Data Units (BPDUs). Based on periodic BPDUs updates (e.g., every two seconds), nodes may keep track of network changes and start and stop forwarding at ports as needed.

In some instances, a node may be misconfigured, fail, experience a hardware fault or software error, or otherwise behave incorrectly causing the loop free topology or elements implementing the loop free protocol algorithm to fail. Node failure or malfunction within a loop free topology can give rise to a loss of connectivity between two or more nodes. Ethernet OAM protocols allow a user to detect connectivity problems using built in fault isolation functions, however they do not allow reliable identification of the underlying location and cause of all types of network problems. Particularly, if any spanning tree instances fail, the troubleshooting process becomes complex (e.g., due to loops, blocking of management interfaces, unreachable devices, etc.) Accordingly, when a loss of connectivity is determined, a manual inspection, node by node, is generally made by a network administrator, a processor, or other user to determine which nodes have failed or malfunctioned. However, a node by node manual inspection of each of the nodes in a bridged network may be time-consuming and/or error prone.

DETAILED DESCRIPTION OF THE PREFERRED EMBODIMENT

Figure 1:
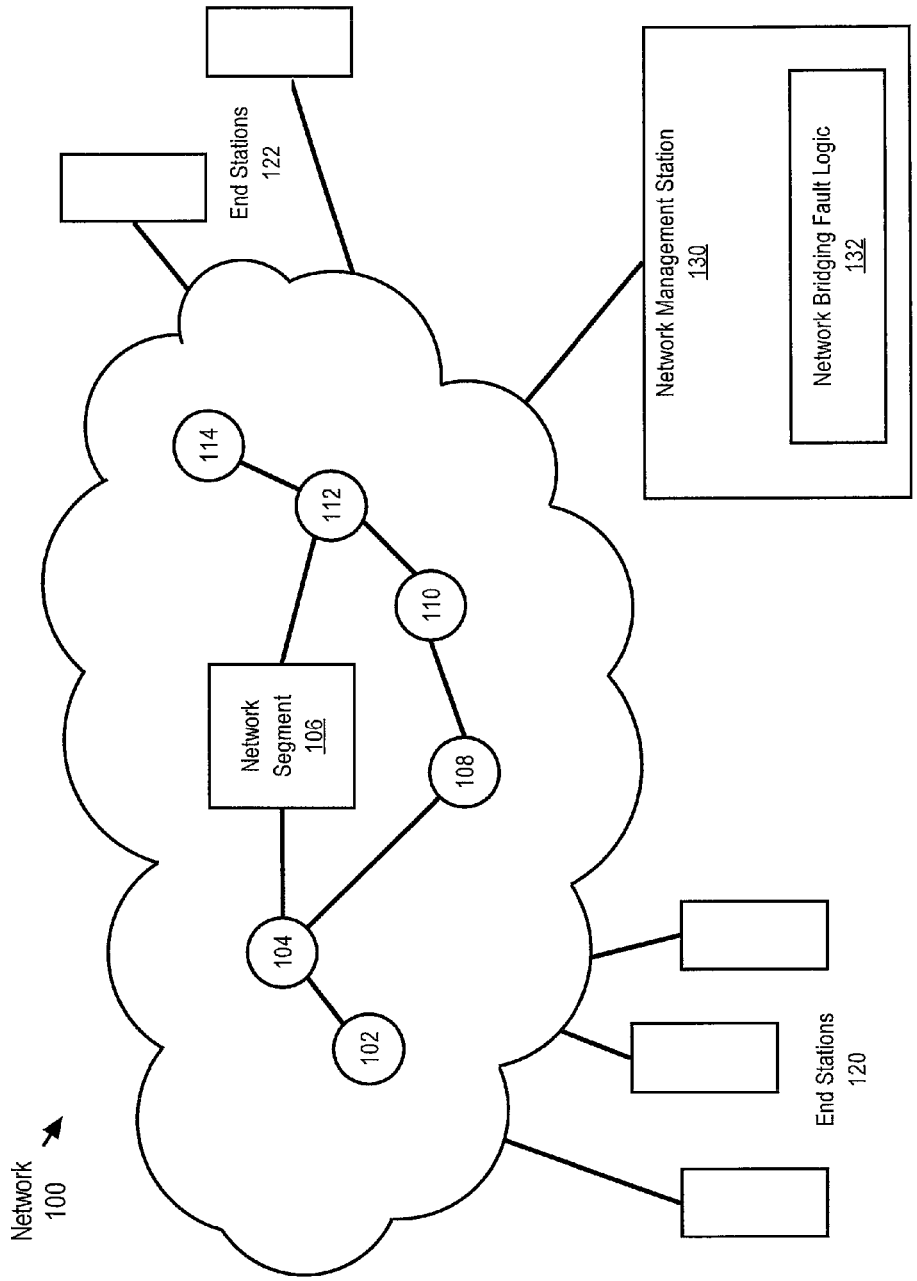
FIG. 1 illustrates a network in accordance with an embodiment.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

General Overview

In an embodiment, an apparatus comprises one or more processors; logic operable in a bridged network and coupled to the one or more processors and comprising one or more stored sequences of instructions which, when executed by one or more processors, cause the one or more processors to generate a reference model of a bridged network representing a plurality of nodes in the bridged network, wherein each of the plurality of nodes implements a loop-free topology algorithm; determine an expected data path based on the reference model of the bridged network; receive information pertaining to an actual data path in the bridged network; and compare the expected data path based on the reference model and the actual data path in the bridged network to identify a divergence point.

In one embodiment, the loop-free topology algorithm is a spanning tree algorithm.

In one embodiment, the loop-free topology algorithm a layer 3 control plane protocol.

In one embodiment, the logic further comprises instructions which when executed cause the one or more processors to receive an Ethernet Connectivity Fault Management (CFM) protocol message indicating a loss of connectivity, wherein determining the expected data path based on the reference model and comparing the expected data path and the actual data path in the bridged network to identify a divergence point is in response to receiving the CFM protocol message.

In one embodiment, the loss of connectivity is determined based on an occurrence of a timeout; a blocked port; a data routing loop; or an error that breaks the data plane.

In one embodiment, the logic further comprises instructions which when executed cause the one or more processors to determine a spanning tree failure based on the divergence point.

In one embodiment, the logic further comprises instructions which when executed cause the one or more processors to receive an event, wherein the event comprises a modification to the plurality of nodes comprised in the bridged network; and perform a full synchronization of the reference model by updating a plurality of network parameters associated with the reference model, based on the modification to the plurality of nodes, to obtain an updated plurality of network parameters; and generating a fully synchronized reference model of the bridged network using the updated plurality of network parameters.

In other aspects, the disclosure encompasses an apparatus with means for the functionality described herein and a computer readable medium comprising instructions, which when executed by one or more processors provide the functionality described herein.

Structural Overview

FIG. 1 illustrates a network in accordance with an embodiment. FIG. 1 illustrates a hypothetical network 100. The hypothetical network 100 may be implemented by any medium or mechanism that provides for the exchange of data between devices within the network. Examples of the hypothetical network 100 include, without limitation, a network such as a Local Area Network (LAN), Wide Area Network (WAN), the Internet, Intranet, Extranet with terrestrial, satellite or wireless links, etc. Alternatively or additionally, any number of nodes connected within the network may also be directly connected to each other through wired or wireless communication segments.

The hypothetical network 100 comprises nodes 102, 104, 108, 110, 112, and 114; a network segment 106; end stations 120 and 122; and a network management station 130. For purposes of illustrating a clear example, a limited number of network segments and nodes are shown in FIG. 1, but the techniques herein may be applied in any network of any size and across one or more OSI layers. Each node (includes nodes within the network segment 106) comprises a computing element such as a router or switch. Each of the nodes comprises a processor, a switching system, memory, and other suitable hardware elements. Each of the nodes further comprises stored program control logic in the form of firmware, hardware, software, or a combination thereof that can implement the functions described herein.

Figure 4A:
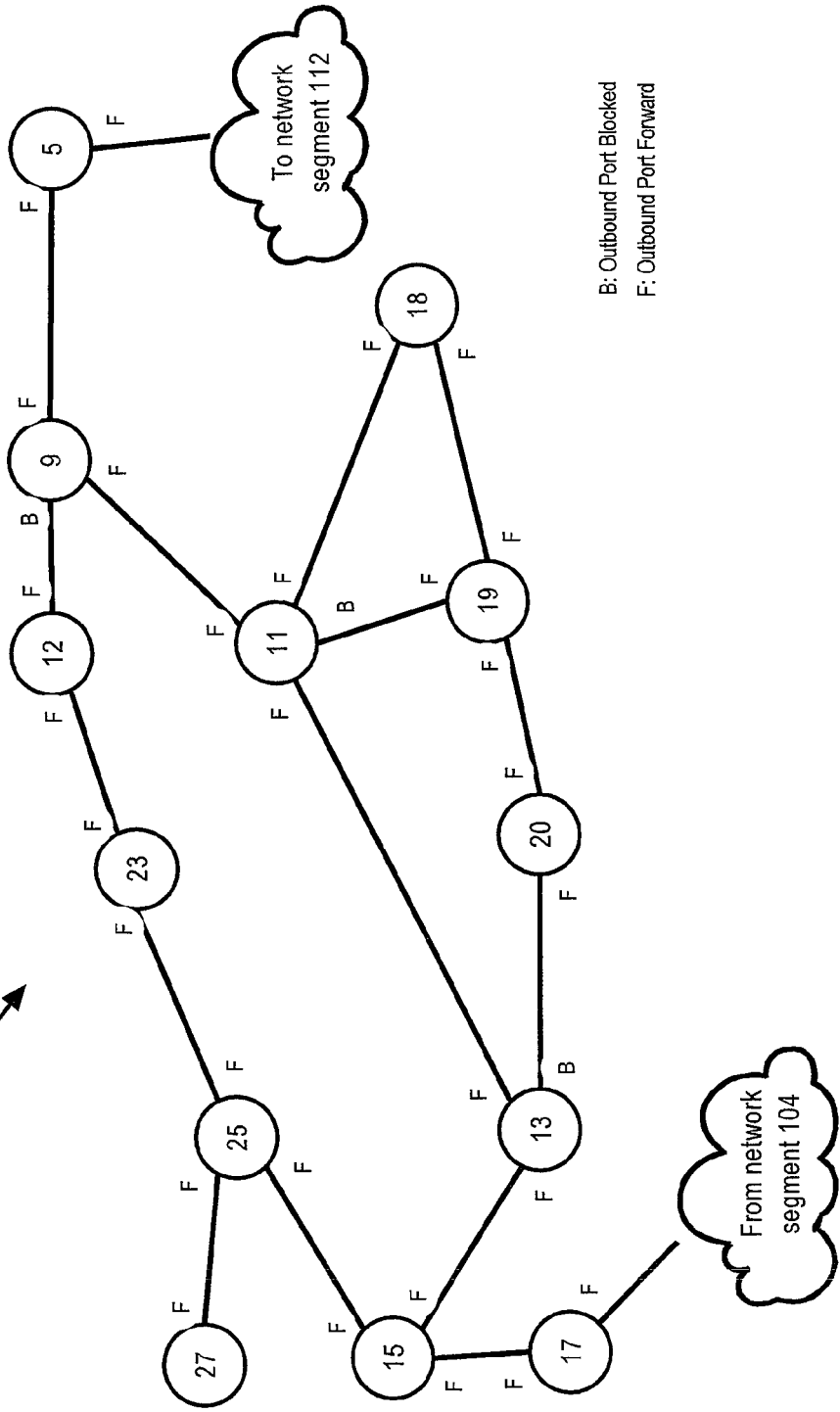
FIG. 4A, FIG. 4B, and FIG. 4C illustrate the use of a reference model to identify a bridging protocol failure.

In an embodiment, each node within the network segment 106, as further discussed in FIG. 4A, comprises an operating system, such as Cisco IOS Software from Cisco Systems, Inc., San Jose, Calif. The operating system may host or control applications such as a network bridging protocol logic, which comprises firmware, hardware, software, or a combination thereof that can implement the functions described below. In one embodiment, the network bridging protocol logic may implement a OSI Layer 2 topology management protocol such as a spanning tree protocol resulting in an active topology of the network segment 106, i.e., the currently selected actual pathways within the bridged network used for forwarding or switching intra-segment and inter-segment frame forwarding e.g., bridging frames between nodes 104 and 112 or within the network segment 106.

In an embodiment, the network segment 106 corresponds to a bridging protocol domain where each of the nodes in the bridging protocol domain include a network bridging protocol logic that implement the same algorithm. For example, the network bridging protocol logic of each of the nodes may implement a spanning tree protocol.

In an embodiment, the network management station 130 is a device that executes network management applications, monitors and controls network elements such as hosts, gateways, terminal servers, end stations, and/or other nodes within the network. In an embodiment, the network management station 130 is coupled to the network segment 106 and is configured to process events from the network segment 106. The network management station 130 may include functionality to receive Connectivity Framework Management (CFM) protocol messages indicating a loss of connectivity or other forwarding failure. In response to a CFM protocol message, the network management station 130 may include functionality to determine the fault as described below with respect to FIG. 2 and FIG. 3. In an embodiment, the network management station 130 comprises network bridging fault logic 132, which may comprise firmware, hardware, software, or a combination thereof in various embodiments that can implement the functions described herein.

Architectural and Functional Overview

Figure 2:
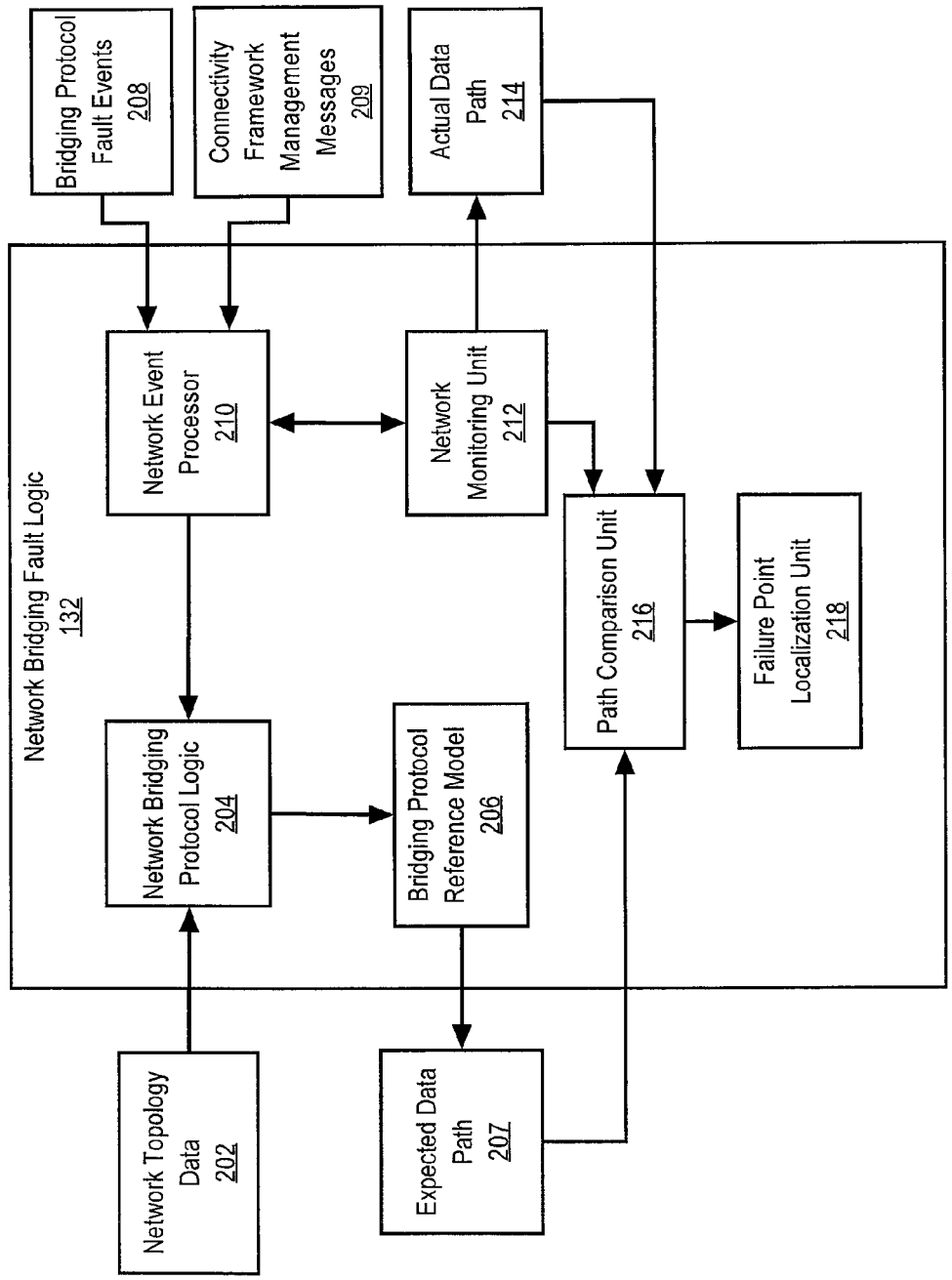
FIG. 2 illustrates an example of network bridging fault logic.

FIG. 2 illustrates an example of network bridging fault logic. In an embodiment, network bridging fault logic 132 comprises a network bridging protocol logic 204, a bridging protocol reference model 206, a network event processor 210, a network monitoring unit 212, a path comparison unit 216 and a failure point localization unit 218.

In an embodiment, the network topology data 202 received or retrieved by the network bridging protocol logic 204 may include, but is not limited to, the number of nodes within a network domain or sub-domain, the operating system and applications implemented on the nodes, the bridging protocol used by the nodes, the status of node ports, the processing bandwidth of each node, the link costs between nodes, the bandwidth of each link, the current frame traffic, the current frame speed, a network resource utilization, etc.

The network bridging protocol logic 204 is configured to receive or retrieve the network topology data 202 and generate a bridging protocol reference model 206, which may include data pertaining to nodes, ports, links, states, etc. in the bridging protocol domain. The bridging protocol reference model 206 may correspond to any representation of the network. The bridging protocol reference model 206 may be used to determine an expected data path 207 between any two points within the bridging protocol domain. An expected data path 207 may include any path information including, but not limited to, specific node paths, node port configuration, path bandwidths, expected frame delay times, expected frame drop rates, and/or other relevant path information. In an embodiment, the network bridging protocol logic 204 uses the same algorithm implemented by the network bridging protocol logic of each of the nodes in a bridging protocol domain to determine an expected data path 207. Use of an identical algorithm may ensure the same computational results when the algorithm is executed.

In an embodiment, the network event processor 210 is configured to receive bridging protocol fault events 208 from one or more network nodes such as routers, switches, etc., the network monitoring unit 212, and/or other network elements. The bridging protocol fault events 208 may include notification of known changes to a bridging protocol domain.

Examples include changes in link costs, addition/deletion of nodes, change in spanning tree architecture within a spanning tree protocol domain such as selection of a new spanning tree root, known failures or down-time of one or more particular nodes. The network event processor 210 may also receive or retrieve CFM messages 209 indicating a loss or reduction of connectivity. A CFM message 209 may be an alarm resulting from a CFM event.

In an embodiment, the network bridging protocol logic 204 is coupled to the network event processor 210 to receive notifications of at least a portion of network events received by the network event processor 210. Examples of events include known changes in the active topology of the bridging protocol domain that affect the bridging protocol reference model 206. The network bridging protocol logic 204 may be configured to update the bridging protocol reference model 206 of the bridging protocol domain based on particular notifications received from the network event processor 210. Examples include changes in link costs, addition/deletion of nodes, modification of node configuration or other event information. The network protocol logic 204 may also be configured to initiate a comparison of an expected data path 207 to an actual data path 214 in response to a CFM message 209 received by the network event processor 210, indicating a loss of connectivity.

In an embodiment, the network monitoring unit 212 is coupled to the network event processor 210 to receive notifications from the network event processor 210 of one or more events or messages from the network. Furthermore, the network monitoring unit 212 may be coupled with the bridging protocol domain for monitoring data flow and network devices. The network monitoring unit 212 may be configured to monitor nodes, links, and/or other network elements to determine information associated with the bridging protocol domain. For example, the network monitoring unit 212 may monitor an individual node to determine the status of one or more ports. As specific examples, nodes may be monitored to determine a blocked or forwarding status. The network monitoring unit 212 may further monitor a performance related criteria. Examples include speed, bandwidth, frame drop rate, or other criteria related to data routing. In an embodiment, the network monitoring unit 212 may be configured to determine an actual data path 214 in the protocol bridging domain based on monitoring information.

In an embodiment, the path comparison unit 216 is configured to compare an actual data path 214 within the bridging protocol domain to an expected data path 207 based on the bridging protocol reference model 206. Accordingly, the path comparison unit 216 may be coupled with the network monitoring unit 212 to receive information related to the actual data path 214 and may further be coupled with the network bridging protocol logic 204 to receive information related to the bridging protocol reference model 206. The path comparison unit 216 may be configured to compare both paths to determine errors, performance, optimization, or other suitable results.

In an embodiment, the failure point localization unit 218 is coupled with the path comparison unit 216 and receives the results generated from the path comparison unit 216. The failure point localization unit 218 may further be coupled to an interface, such as a user interface, or to a suitable device or program to present failure point location information. In an embodiment, the failure localization unit 218 may identify a node, a link, a group of nodes or other components in the bridging protocol domain to indicate a failure or error status.

All components of the network bridging fault logic 132 may be integrated into a single unit of software, firmware, or a combination. Thus, the separate blocks shown in FIG. 2 are provided solely to illustrate one example.

Failure Point Detection

Figure 3:
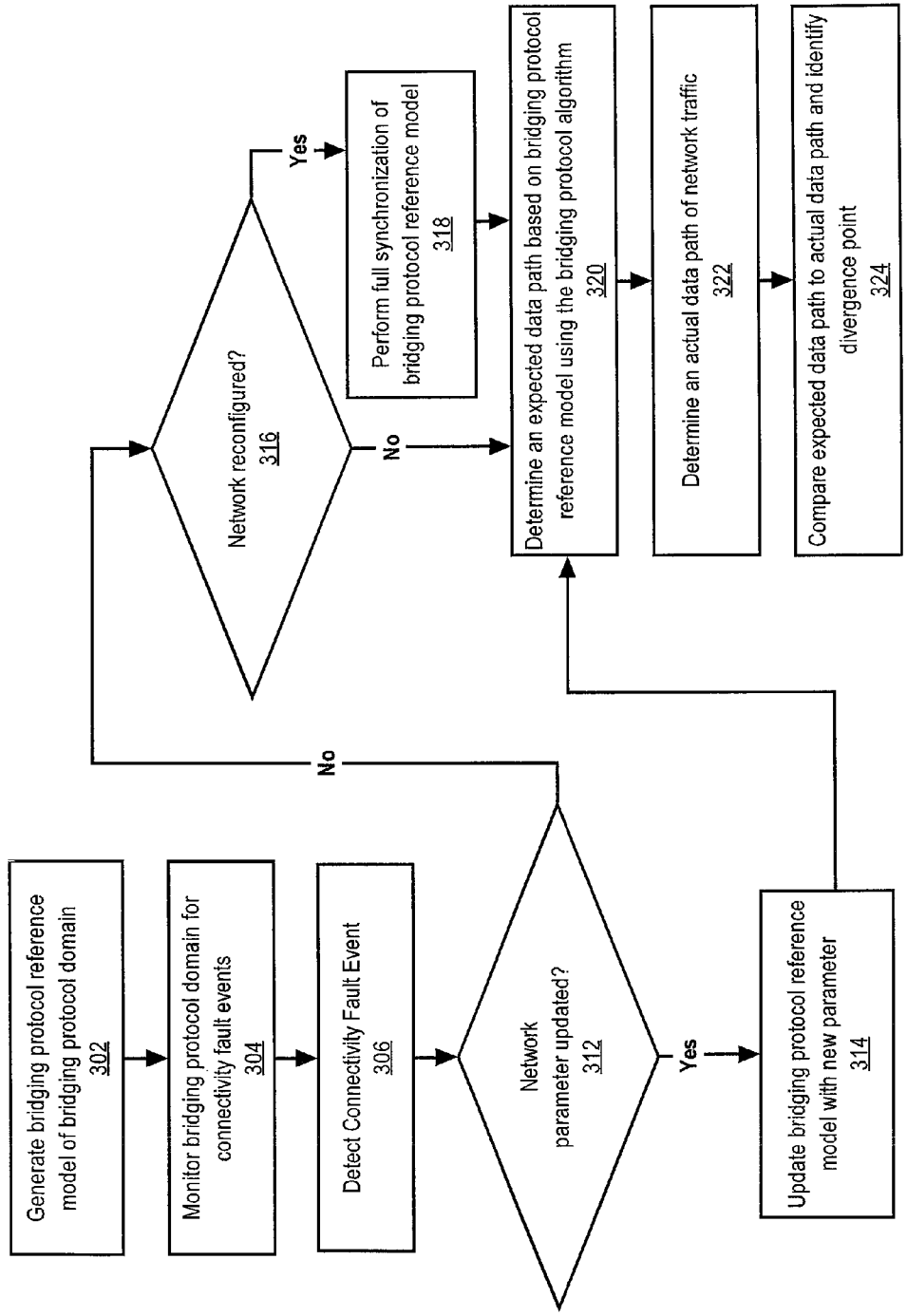
FIG. 3 illustrates identifying a failure point in a bridged protocol domain.

FIG. 3 illustrates identifying a failure point in a bridged protocol domain. In an embodiment, one or more of the steps described below may be omitted, repeated, or performed in a different order and the specific arrangement shown in FIG. 3 is not required.

In Step 302, a bridging protocol reference model of a bridged protocol domain is generated. A bridging protocol reference model is generated by collecting information about the bridged protocol domain. The information may be collected by querying each component with the bridged protocol domain, or may be collected by querying a database with information pertaining to components within the bridged protocol domain. The information may also be collected by monitoring the bridged protocol domain, e.g., to determine link speed, bandwidth, etc. A bridging protocol domain within a network may be discovered by receiving node information for each of the nodes within the bridging protocol domain from a process, program, or a user. In an embodiment, nodes within a network may be polled to determine whether they belong to a particular bridging protocol domain. In another embodiment, the bridging protocol domain within a network may be discovered by monitoring data within the network and for example, identifying a root node that all other nodes within the bridging protocol domain forward frames to. Network parameters including, but not limited to, link information, bandwidth information, physical topology information, and the network bridging protocol implemented by nodes in the bridged protocol domain, may be requested from one or more nodes within the bridging protocol domain. In response, each node may provide information individually, or one or more designated nodes may collect and provide the information. In another embodiment, each bridging protocol domain may be associated with one or more data repositories that include the network topology information which may directly be queried for any suitable information.

In Step 304, the bridging protocol domain is monitored for bridging protocol events that could affect the bridging protocol (e.g., STP). If a bridging protocol event is identified, the reference model may be updated to reflect changes in the bridging protocol domain. The bridging protocol domain may actively be monitored. For example, active monitoring may comprise querying nodes for events or may passively be monitored by waiting for events to be received from the nodes or other network devices. The bridging protocol domain may be continuously or periodically monitored.

In Step 306, a connectivity fault event occurs and is detected through active or passive monitoring. The connectivity fault event may be detected by receiving a CFM message (includes alarms) at a network management station. The connectivity fault event may be generated as a result of a loss of connectivity between nodes, a longer than expected delay between data transmissions, a failure of a link or node, an unknown change in link cost, an improper port configuration, etc. In a loop free active topology such as nodes implementing a spanning tree protocol, the connectivity fault event may signal a loss of connectivity if the error is a detection of data or OAM frame drop rate increasing, a loop signaled by data or OAM frame being received by a node that sent out the frame (indicating loop), or failure of heartbeat messages. A connectivity fault event may also be the result of a change in the bridging protocol domain. Accordingly, in an embodiment, the bridging protocol reference may be updated (Step 312-Step 318).

The update to the bridging protocol reference model may involve an update to one or more parameters or involve a full synchronization based on bridging protocol domain. If the connectivity fault event indicates a modification to the network such as an update to a network parameter (Step 312), then the affected network parameter may be updated (Step 314) to reflect the changes in the network. For example, if a link bandwidth or cost is modified, the reference model may be updated to include the updates to the link bandwidth or cost. However, if a network is reconfigured (Step 316), then a full synchronization of the bridging protocol reference model (Step 318) may be performed. For example, if a node is removed from a network resulting in a reconfiguration of the network, a full synchronization may be performed to ensure that the bridging protocol reference model accurately reflects the current bridging protocol domain. A full synchronization involves one or more steps for building the reference model, described above in Step 302.

In Step 320, an expected data path may be determined based on the bridging protocol reference model using the bridging protocol algorithm and also data contained within the CFM event, e.g. source and destination node. For example, a destination node (e.g., a bridged network boundary node) in bridging protocol domain may initiate the process by a connectivity fault event in relation to a source node. In this example, an expected data path from the source node to the destination node may be determined based on the reference model of the bridging protocol domain. The expected data pathway may be generated by any process or program that can accept network parameters such as network topology, node information, link information, etc. and determine based on the input the calculations performed by each node to establish the active topology. In an embodiment, an expected status of all ports within a node along the expected pathway may also be included in the information associated with the expected pathway. For example, the expected status may be "blocked" or "forwarding."

Furthermore, the actual path taken by frames sent between nodes within the bridging protocol domain is also determined (Step 322). For example, the actual path may be determined by a monitoring agent such as network device coupled to the bridging protocol domain that queries nodes within the network for frame information. Alternatively, links or nodes within the bridging protocol domain may be monitored for transmission of the frames. In another embodiment, the actual data path taken by the frames sent from a node may be determined using messages sent by nodes within the bridging protocol domain. For example, each node within the network may be programmed to indicate the receipt of frames with particular headers to a network management device. An example header might indicate a network tester frame. In another embodiment, an actual port status of all ports within each node along the expected pathway is determined.

Once the expected data pathways in the bridging protocol domain and the actual data pathways in the bridging protocol domain are determined, the two data pathways may be compared to determine a divergence point where the expected data pathway and the actual data pathway differ (Step 324). The comparison of the expected data pathway and the actual data pathway may include a comparison of any actual network component with the corresponding expected network component in the reference model. For example, in one embodiment, an expected port state of all ports of nodes in the reference model along the expected pathway may be compared with an actual port state of all ports of nodes in the actual bridging protocol domain. Any differences between the port states from the reference model and the port states from the actual bridging protocol domain may be indicative of a potential STP problem. In another example, the performance of a path based on the reference model may be compared with the performance of the path in the actual bridging protocol domain. Differences found by the comparison are defined as the divergence points. In an embodiment, the divergence points are presumed to be failure points and accordingly, the actual components of the bridging protocol may be reconfigured to match the reference model of the bridging protocol domain. In another embodiment, the divergence points may be presented to a user. For example, divergence points may be displayed on an interface, printed, or otherwise provided to a network administrator for modification. In an embodiment, multiple divergence points may be identified. For example, multiple divergence points may occur if more than one port or more than one node is divergent from the reference model.

Example Failure Detection in Bridging Protocol Domain

Figure 4B:
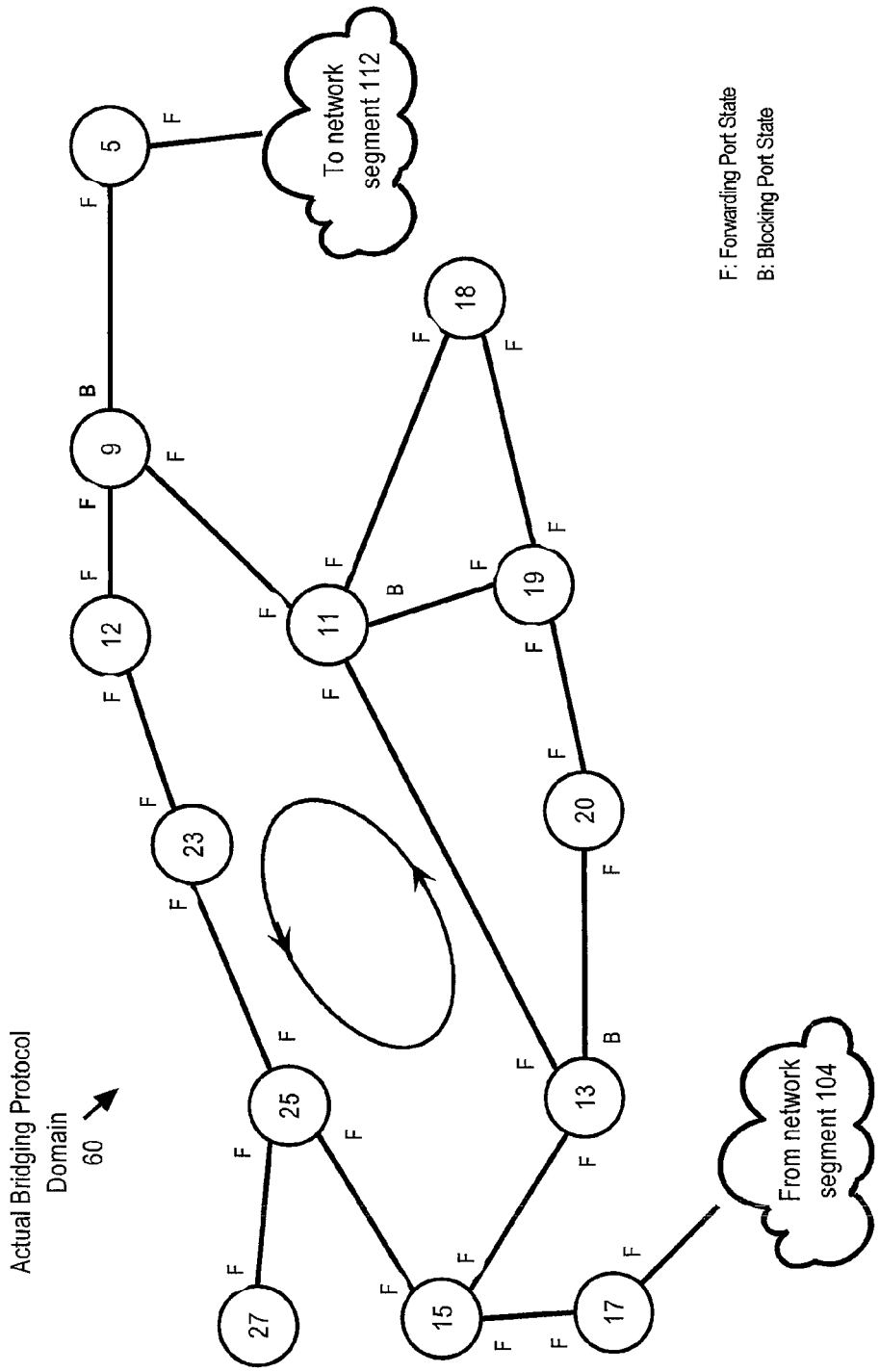
Figure 4C:
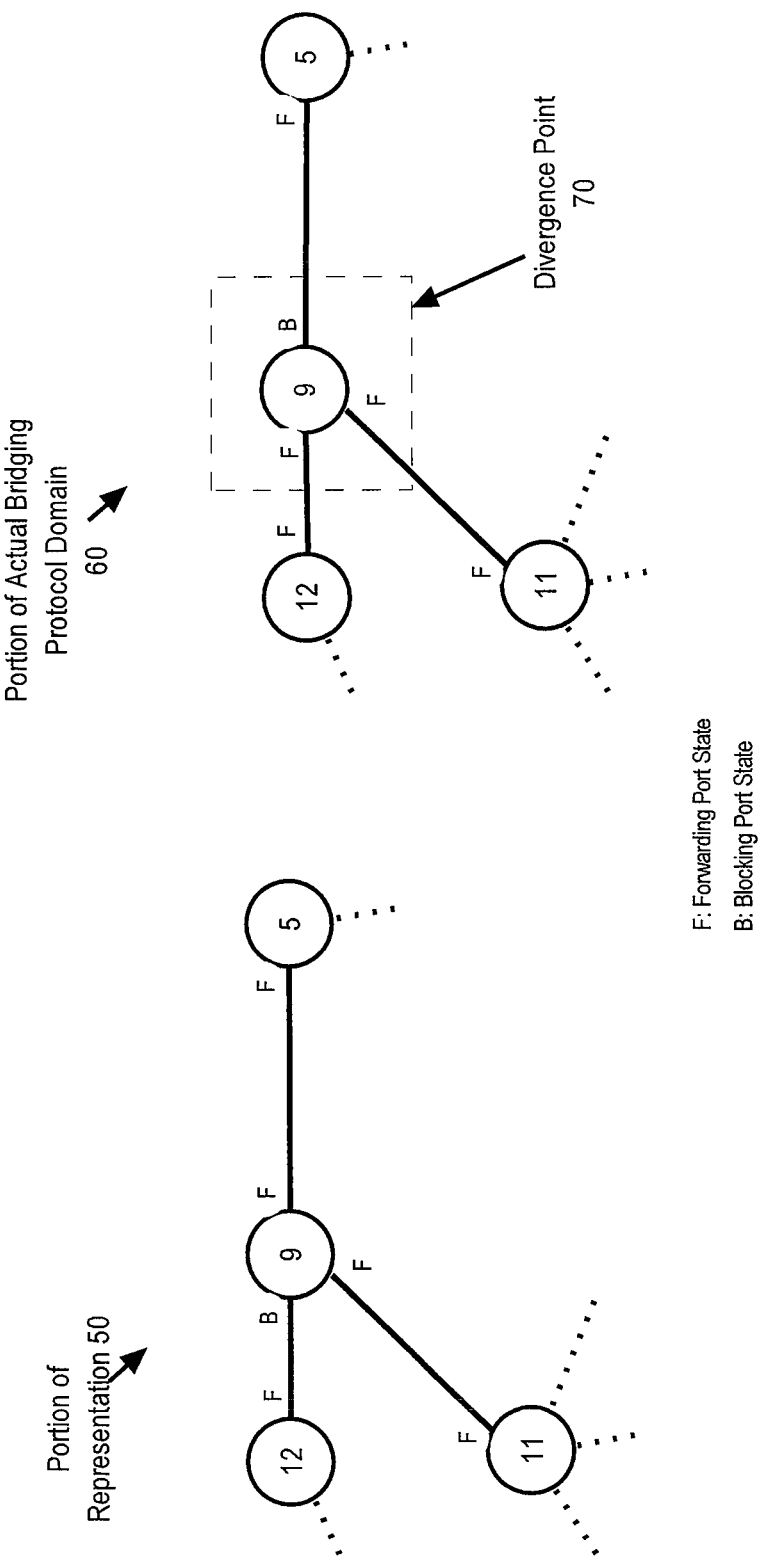

FIG. 4A, FIG. 4B, and FIG. 4C illustrate the use of a reference model to identify a bridging protocol failure. FIG. 4A is a representation 50 based on a reference model of the network segment 106 from the hypothetical network 100. The representation 50 based on the reference model shown in FIG. 4A illustrates one example. Alternatively, the representation 50 of the reference model may correspond to any format, and need not be represented graphically. For example, information corresponding to each node such as port information, neighboring node information and link information may be stored as text in a table.

The representation 50 includes nodes 17, 15, 25, 27, 23, 12, 9, 5, 13, 11, 20, 19, and 18. The status of each port within each node is represented with either a 'B' or an 'F', where B represents blocked ports and F represents forwarding ports. A blocked port blocks incoming or outgoing frames, while a forwarding port allows incoming or outgoing frames. For example, as shown in FIG. 4A, node 9 forwards frames received from node 11 to node 5; however, node 9 does not forward frames to or receive frames from node 12. Accordingly, in a loop free topology where each node implements shortest path first protocol and where node 5 is a root node that forwards frames to network segment 112, a frame would take the shortest path from node 17 to the root node 5. Therefore, the expected data pathway beginning at node 17 to the root node 5 is: node 17→node 15→node 13→node 11→node 9→root node 5→toward network segment 112.

FIG. 4B shows the actual bridging protocol domain 60 corresponding to the reference model 50 shown in FIG. 4A. In the actual bridging protocol domain, a frame forwarded by node 15 to node 13 was received back by node 15 from node 25. This indicates the existence of a loop and generates a bridging protocol fault event because a bridging protocol domain implementing a spanning tree protocol does not include any loops. In this example, the loop is shown in FIG. 4B and includes nodes 15→13→11→9→12→23→25→15.

Accordingly, to determine the cause of the loop, at least one expected data pathway based on the representation 50 (from FIG. 4A) is compared to the actual bridging protocol domain 60 (shown in FIG. 4B). Comparing the expected data pathway and the actual data pathway involves a comparison of any portion of the network including links and nodes within the network. Thus, in this example, a comparison of the expected data pathway to the actual data pathway includes the comparison of node 9 from the reference model 50 to the node 9 from the actual bridging protocol domain 60.

As shown in FIG. 4C, the ports of node 9 from the reference model 50 are operating differently than the ports of actual node 9 within the actual bridging protocol domain 60. In particular, as shown in the portion of the reference model 50, node 9 is expected to forward to node 5 and block frames to node 12 resulting in the portion of the expected data pathway: node 11→node 9→node 5. However, in the actual bridging protocol domain 60, node 9 is configured to forward frames to node 12 and block frames to node 5 resulting in the portion of the actual data pathway: node 11→node 9→node 12. Therefore, actual node 9 within the bridging protocol domain 60 is divergent from the node 9 of the reference model 50 and can be identified as a divergence point 70. The divergence point 70, in this example, is an erroneous configuration of node 9 in the actual bridging protocol domain 60 and results in the frame loop shown in FIG. 4B.

In an embodiment, the node 9 in the actual bridging protocol domain 60 may simply be reconfigured to match node 9 in the representation 50. In another embodiment, the divergence point 70 may be presented to a user, e.g. a network administrator. In another embodiment, if the configuration of node 9 cannot be immediately modified, for example, if a node 9 port has a hardware failure, the reference model may be updated and a new route may be determined.

Hardware Overview

Figure 5:
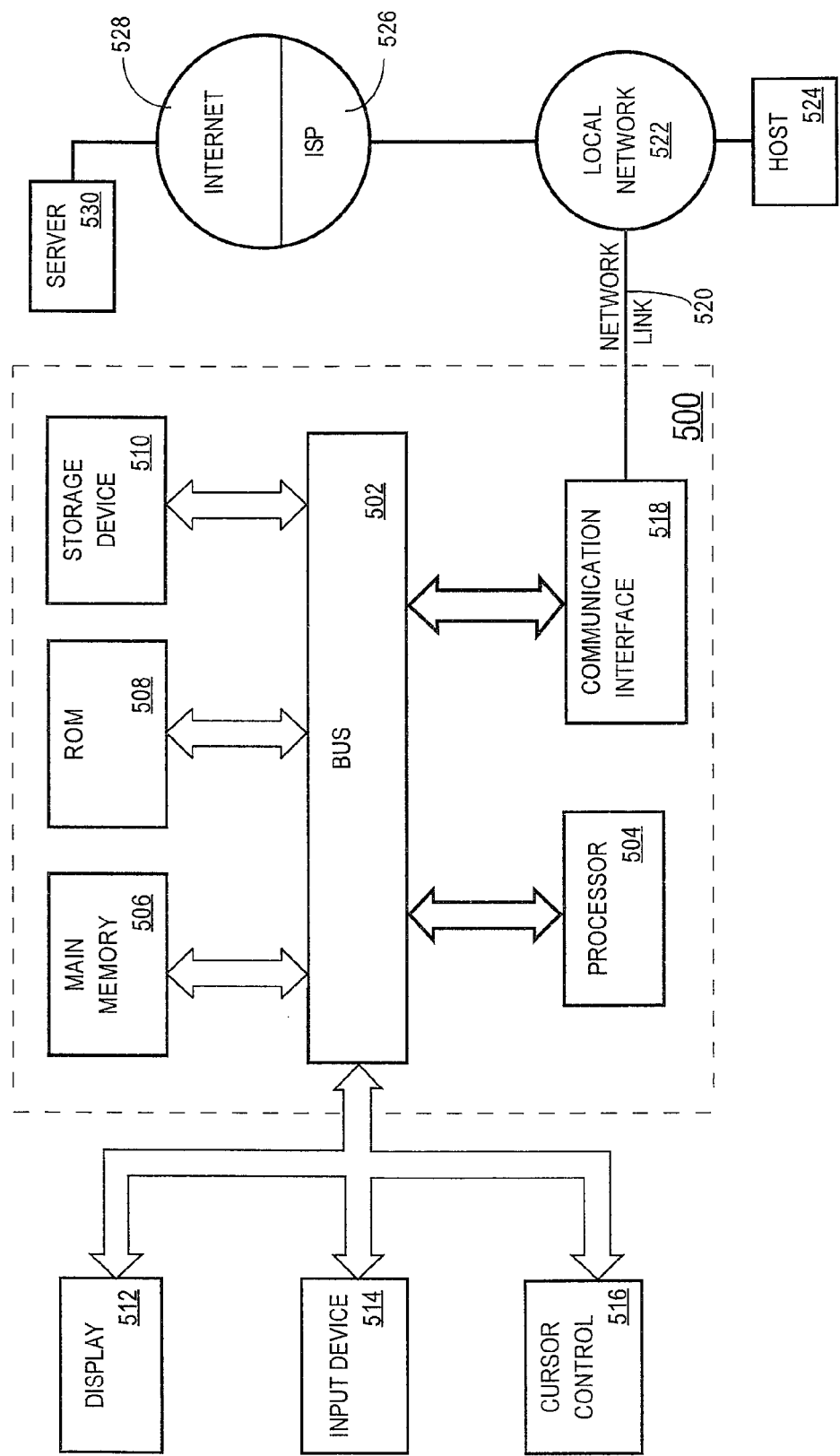
FIG. 5 illustrates a computer system upon which one or more embodiments may be implemented.

FIG. 5 is a block diagram that illustrates a computer system 500 upon which an embodiment may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
    one or more processors;
    a non-transitory computer readable storage medium comprising one or more stored sequences of instructions which, when executed by one or more processors, cause the one or more processors to:
        generate a reference model of a bridged network representing a plurality of nodes in the bridged network, wherein each of the plurality of nodes implements a loop-free topology algorithm;
        determine an expected data path based on the reference model of the bridged network;
        receive information representing an actual data path in the bridged network;
        wherein the actual data path is determined by monitoring one or more components along the actual data path in the bridged network; and
        compare the expected data path based on the reference model and the actual data path in the bridged network to identify a divergence point from which the expected data path and the actual data path differ;
        wherein the divergence point represents a particular node from which outbound data, intended for a destination node, is sent to a receiving node on the actual data path that is different than an expected receiving node on the expected data path;
        responsive to identifying the divergence point, performing one or more of:
            presenting the divergence point to a user; reconfiguring the divergence point based on the reference model; updating the reference model based on the divergence point.

2. The apparatus of claim 1, wherein the loop-free topology algorithm is based on a layer 3 control plane protocol.

3. The apparatus of claim 1, wherein the non-transitory computer readable storage medium further comprises instructions which when executed cause the one or more processors to receive an Ethernet Connectivity Fault Management (CFM) protocol message indicating a loss of connectivity, wherein determining the expected data path based on the reference model and comparing the expected data path and the actual data path in the bridged network to identify a divergence point is in response to receiving the CFM protocol message.

4. The apparatus of claim 3, wherein the loss of connectivity is determined based on an occurrence of a timeout; a blocked port; a data routing loop; or an error that breaks the data plane.

5. The apparatus of claim 1, wherein the non-transitory computer readable storage medium further comprises instructions which when executed cause the one or more processors to determine a spanning tree failure based on the divergence point.

6. The apparatus of claim 1, wherein the non-transitory computer readable storage medium further comprises instructions which when executed cause the one or more processors to:
    receive an event, wherein the event comprises a modification to the plurality of nodes comprised in the bridged network; and
    perform a full synchronization of the reference model by updating a plurality of network parameters associated with the reference model, based on the modification to the plurality of nodes, to obtain an updated plurality of network parameters; and
        generating a fully synchronized reference model of the bridged network using the updated plurality of network parameters.

7. The apparatus as recited in claim 1, wherein the non-transitory computer readable medium further comprises instructions which, when executed by the one or more processors, cause comparing the expected data path and the actual data path by comparing an expected status of a port on the particular node with an actual status of a port on the particular node, wherein the expected status of the port is based on the reference model of the bridged network and the actual status of the port is based on monitoring of the particular node.

8. The apparatus as recited in claim 1, wherein the non-transitory computer readable medium further comprises instructions which, when executed by the one or more processors, cause: responsive to identifying the divergence point, presenting the divergence point to the user.

9. The apparatus as recited in claim 1, wherein the non-transitory computer readable medium further comprises instructions which, when executed by the one or more processors, cause: responsive to identifying the divergence point, reconfiguring the divergence point based on the reference model.

10. The apparatus as recited in claim 1, wherein the non-transitory computer readable medium further comprises instructions which, when executed by the one or more processors, cause: responsive to identifying the divergence point, updating the reference model based on the divergence point.

11. An apparatus comprising:
    one or more processors;
    means for generating a reference model of a bridged network representing a plurality of nodes in the bridged network, wherein each of the plurality of nodes implements a loop-free topology algorithm;
    means for determining an expected data path based on the reference model of the bridged network;
    means for receiving information representing an actual data path in the bridged network;

wherein the actual data path is determined by monitoring one or more components along the actual data path in the bridged network; and means for comparing the expected data path based on the reference model and the actual data path in the bridged network to identify a divergence point from where the expected data path and the actual data path differ;

wherein the divergence point represents a particular node from which outbound data, intended for a destination node, is sent to a receiving node on the actual data path that is different than an expected receiving node on the expected data path;

means for performing, responsive to identifying the divergence point, one or more of: presenting the divergence point to a user; reconfiguring the divergence point based on the reference model; updating the reference model based on the divergence point.

12. The apparatus of claim 11, wherein the loop-free topology algorithm is based on a layer 3 control plane protocol.

13. The apparatus of claim 11, further comprising means for receiving an Ethernet Connectivity Fault Management (CFM) protocol message indicating a loss of connectivity, and wherein determining the expected data path based on the reference model and comparing the expected data path and the actual data path in the bridged network to identify a divergence point is in response to receiving the CFM protocol message.

14. The apparatus of claim 13, wherein the loss of connectivity is determined based on an occurrence of a timeout; a blocked port; a data routing loop; or an error that breaks the data plane.

15. The apparatus of claim 11, further comprising a means for determining a spanning tree failure based on the divergence point.

16. The apparatus of claim 11, further comprising:
means for receiving an event, wherein the event comprises a modification to the plurality of nodes comprised in the bridged network; and
means for performing a full synchronization of the reference model by updating a plurality of network parameters associated with the reference model, based on the modification to the plurality of nodes, to obtain an updated plurality of network parameters; and generating a fully synchronized reference model of a bridged network using the updated plurality of network parameters.

17. The apparatus as recited in claim 11, further comprising means for comparing the expected data path and the actual data path by comparing an expected status of a port on the particular node with an actual status of a port on the particular node, wherein the expected status of the port is based on the reference model of the bridged network and the actual status of the port is based on monitoring of the particular node.

18. The apparatus as recited in claim 1, further comprising means for: responsive to identifying the divergence point, presenting the divergence point to the user.

19. The apparatus as recited in claim 11, further comprising means for: responsive to identifying the divergence point, reconfiguring the divergence point based on the reference model.

20. The apparatus as recited in claim 11, further comprising means for: responsive to identifying the divergence point, updating the reference model based on the divergence point.

21. A computer readable storage medium comprising one or more sequences of instructions, which when executed by one or more processors cause:
generating a reference model of a bridged network representing a plurality of nodes in the bridged network, wherein each of the plurality of nodes implements a loop-free topology algorithm;
determining an expected data path based on the reference model of the bridged network;
receiving information representing an actual data path in the bridged network from a first network infrastructure element;
wherein the actual data path is determined by monitoring one or more components along the actual data path in the bridged network; and
comparing the expected data path based on the reference model and the actual data path in the bridged network to identify a divergence point from which the expected data path and the actual data path differ;
wherein the divergence point represents a particular node from which outbound data, intended for a destination node, is sent to a receiving node on the actual data path that is different than an expected receiving node on the expected data path;
responsive to identifying the divergence point, performing one or more of: presenting the divergence point to a user; reconfiguring the divergence point based on the reference model; updating the reference model based on the divergence point.

22. The computer readable storage medium of claim 21, wherein the loop-free topology algorithm is based on a layer 3 control plane protocol.

23. The computer readable storage medium of claim 21, wherein the one or more sequences of instructions, when executed by one or more processors further cause receiving an Ethernet Connectivity Fault Management (CFM) protocol message indicating a loss of connectivity, wherein determining the expected data path based on the reference model and comparing the expected data path and the actual data path in the bridged network to identify a divergence point is in response to receiving the CFM protocol message.

24. The computer readable storage medium of claim 23, wherein the loss of connectivity is determined based on an occurrence of a timeout; a blocked port; a data routing loop; or an error that breaks the data plane.

25. The computer readable storage medium of claim 21, wherein the one or more sequences of instructions, when executed by one or more processors further cause determining a spanning tree failure based on the divergence point.

26. The computer readable storage medium of claim 21, wherein the one or more sequences of instructions, when executed by one or more processors further cause:
receiving an event, wherein the event comprises a modification to the plurality of nodes comprised in the bridged network; and
performing a full synchronization of the reference model by updating a plurality of network parameters associated with the reference model, based on the modification to the plurality of nodes, to obtain an updated plurality of network parameters; and generating a fully synchronized reference model of the bridged network using the updated plurality of network parameters.

27. The computer readable storage medium as recited in claim 21, wherein the computer readable medium further comprises instructions which, when executed by the one or more processors, cause comparing the expected data path and the actual data path by comparing an expected status of a port on the particular node with an actual status of a port on the particular node, wherein the expected status of the port is based on the reference model of the bridged network and the actual status of the port is based on monitoring of the particular node.

28. The computer readable storage medium as recited in claim 21, wherein the computer readable medium further comprises instructions which, when executed by the one or more processors, cause: responsive to identifying the divergence point, presenting the divergence point to the user.

29. The computer readable storage medium as recited in claim 21, wherein the computer readable medium further comprises instructions which, when executed by the one or more processors, cause: responsive to identifying the divergence point, reconfiguring the divergence point based on the reference model.

30. The computer readable storage medium as recited in claim 21, wherein the computer readable medium further comprises instructions which, when executed by the one or more processors, cause: responsive to identifying the divergence point, updating the reference model based on the divergence point.

31. A method comprising:
generating a reference model of a bridged network representing a plurality of nodes in the bridged network, wherein each of the plurality of nodes implements a loop-free topology algorithm;
determining an expected data path based on the reference model of the bridged network;
receiving information representing an actual data path in the bridged network;
wherein the actual data path is determined by monitoring one or more components along the actual data path in the bridged network; and
at least one device comparing the expected data path based on the reference model and the actual data path in the bridged network to identify a divergence point from which the expected data path and the actual data path differ;
wherein the divergence point represents a particular node from which outbound data, intended for a destination node, is sent to a receiving node on the actual data path that is different than an expected receiving node on the expected data path;
responsive to identifying the divergence point, performing one or more of: presenting the divergence point to a user; reconfiguring the divergence point based on the reference model; updating the reference model based on the divergence point.

32. The method of claim 31, further comprising receiving an Ethernet Connectivity Fault Management (CFM) protocol message indicating a loss of connectivity, wherein determining the expected data path based on the reference model and comparing the expected data path and the actual data path in the bridged network to identify a divergence point is in response to receiving the CFM protocol message.

33. The method of claim 32, wherein the loss of connectivity is determined based on an occurrence of a timeout; a blocked port; a data routing loop; or an error that breaks the data plane.

34. The method of claim 31, further comprising determining a spanning tree failure based on the divergence point.

35. The method as recited in claim 31, wherein comparing the expected data path and the actual data path comprises comparing an expected status of a port on the particular node with an actual status of a port on the particular node, wherein the expected status of the port is based on the reference model of the bridged network and the actual status of the port is based on monitoring of the particular node.

36. The method as recited in claim 31, further comprising responsive to identifying the divergence point, presenting the divergence point to the user.

37. The method as recited in claim 31, further comprising responsive to identifying the divergence point, reconfiguring the divergence point based on the reference model.

38. The method as recited in claim 31, further comprising responsive to identifying the divergence point, updating the reference model based on the divergence point.

* * * * *

UNITED STATES PATENT AND TRADEMARK OFFICE
CERTIFICATE OF CORRECTION

PATENT NO. : 8,441,941 B2  
APPLICATION NO. : 12/245895  
DATED : May 14, 2013  
INVENTOR(S) : Iain McDade et al.

Page 1 of 1

It is certified that error appears in the above-identified patent and that said Letters Patent is hereby corrected as shown below:

In the claims:

Claim 18 column 13, line 53, replace "1" with --11--.

Signed and Sealed this  
Tenth Day of September, 2013

Teresa Stanek Rea  
*Acting Director of the United States Patent and Trademark Office*